(12) United States Patent
Helden et al.

(10) Patent No.: US 7,254,367 B2
(45) Date of Patent: Aug. 7, 2007

(54) METHOD AND APPARATUS FOR PAIRING AND CONFIGURING WIRELESS DEVICES

(75) Inventors: Jan-Willem Helden, Linne (NL); Gerrit Willem Hiddink, Utrecht (NL); Harald van Kampen, Utrecht (NL); Eric Lammerts, Indialantic, FL (US)

(73) Assignee: Agere Systems Inc., Allentown, PA (US)

( * ) Notice: Subject to any disclaimer, the term of this patent is extended or adjusted under 35 U.S.C. 154(b) by 450 days.

(21) Appl. No.: 10/874,993

(22) Filed: Jun. 23, 2004

(65) Prior Publication Data

US 2005/0287950 A1 Dec. 29, 2005

(51) Int. Cl.
*H04B 7/00* (2006.01)
(52) U.S. Cl. ............... 455/41.2; 455/435.1; 455/412.1; 455/458; 370/338; 358/1.13
(58) Field of Classification Search ............... 455/41.2, 455/435.1, 458, 557, 412.1
See application file for complete search history.

(56) References Cited

U.S. PATENT DOCUMENTS

| | | | | |
|---|---|---|---|---|
| 6,560,216 | B1 * | 5/2003 | McNiff et al. | 370/349 |
| 6,795,421 | B1 * | 9/2004 | Heinonen et al. | 370/338 |
| 6,954,443 | B2 * | 10/2005 | Forstadius et al. | 370/331 |
| 6,954,641 | B2 * | 10/2005 | McKenna et al. | 455/435.1 |
| 7,016,682 | B2 * | 3/2006 | Won et al. | 455/445 |
| 7,089,298 | B2 * | 8/2006 | Nyman et al. | 709/220 |

* cited by examiner

*Primary Examiner*—Marceau Milord

(57) ABSTRACT

A method and mechanism for quickly and easily connecting wireless consumer electronic devices with each other without affecting other wireless devices in the vicinity, by bringing devices into close proximity while in a whisper mode of communication. In whisper mode, the reception and/or transmission capability is significantly reduced, limiting the distance over which the devices communicate, allowing for secure exchange of communications parameters The parameters exchanged in whisper mode may be used to enable unique, paired communication between the two devices, or between one of them and any other device already connected to a common network, when operating in their normal mode of operation, separated by any distance within the normal operational range of the devices.

18 Claims, 4 Drawing Sheets

METHOD AND APPARATUS FOR PAIRING AND CONFIGURING WIRELESS DEVICES

FIELD OF THE INVENTION

The present invention relates to the field of consumer electronic wireless devices and more particularly to methods and apparatus for connecting and configuring such wireless devices in a network.

BACKGROUND OF THE INVENTION

In a communications or entertainment network, devices need to be interconnected so that any two devices are capable of communicating with each other. In this way, content originating from any media source within the network can be made to flow to any intended media destination within the network. For instance, if an entertainment network includes a DVD player and multiple video display units, it is desirable that any video produced by the DVD player can be directed to any specific video display unit within the network. It is also desirable that any audio accompanying the video be automatically directed to speakers associated with that video display unit.

One method of achieving such interconnectivity is to assign each device on a network a unique identifier. The device, however, first needs to be connected to the network. This may be done by providing each device with a default identifier (also known as "factory setting"). Upon initial connection, the device may use this identifier to communicate with the other devices on the network. Once in communication, the device may then learn the unique identifiers of the existing devices, and acquire its own, unique identifier. Having established these unique identifiers, any device on the network may communicate uniquely with any other device on the network.

For instance, when a DVD player is connected to a network, it may initially communicate with other devices in the network using factory settings that merely identify it as a DVD player. Having established initial communications, it may then exchange data with other devices in the network, obtain their unique identifiers, and establish itself as DVD player number 1, and. When a second DVD device is attached, it too may initially communicate using factory settings, exchange data with all other devices in the network, and establish itself as DVD player number 2. In this way, each device acquires a unique identity within the network, enabling data to flow to and from the required devises.

In traditional wired networks, such unique, paired connections may be established in a straightforward manner via the physical cables linking the devices. Security is ensured because the data is exchanged over the cables that physically connect the devices into the network, so that only physically connected devices can participate in the data exchange. If the data exchange is performed upon connecting each device, both uniqueness and security may be easily maintained, even though like devices are manufactured and distributed with the like default identities and default parameters.

This straight forward and secure approach is not possible with wireless networks. A problem in setting up wireless networks is that each device is capable of communicating with any other suitable, or receptive, device that happens to be within its operational range. For instance, wireless devices communicating using the IEEE 802.11b protocol (also known as "WiFi") typically have an operational range of 30-100 meters. A WiFi enabled device using default settings is therefore initially capable of communicating with any other WiFi enabled device with default setting that happens to be within that 30-100 meter range. This creates problems in setting up user networks, particularly in urban environments in which the WiFi range of operation may include several apartment units or dwellings. In attempting to set up a network in one apartment, a user may inadvertently incorporate devices from neighboring apartments. The negative results of such mistakes are easy to imagine and may include situations such as viewing images from a neighbors DVD player or listening to content originating from a neighbor's audio device.

Manufacturing each pair of wireless devices with unique, matching parameters would not only be a huge logistical problem, but would restrict each pair of devices to having to be used together. Such a lack of interoperability or exchangeability of devices is unacceptable to manufacturers, sales staff and consumers.

In computer wireless networks, privacy, if desired, is maintained by encryption schemes such as, but not limited to, Wire Equivalent Protocol (WEP). Setting up such a secure wireless network requires entering encryption keys into memory on each of the participating wireless devices. This not only requires a reasonable degree of technical sophistication, but also requires having a keyboard at each entry point and is time consuming. Consumer electronic wireless devices typically do not have a keyboard. Ideally, they should be capable of being quickly and easily networked by the average consumer who has little technical expertise.

What is needed is a mechanism that allows an unsophisticated, and possibly impatient, user to create and expand a consumer product wireless network by quickly and easily establishing unique links between any pair of wireless devices, while preventing accidental connection to any wireless device not intended to be part of the network.

SUMMARY OF THE INVENTION

Briefly described, the present invention provides a mechanism for pairing and configuring two wireless devices. An objective of the invention is allow two consumer wireless devices to be quickly and easily connected with each other in a manner that allows a unique, paired communication between them.

In a preferred embodiment, this is accomplished by operating the two wireless devices in a whisper mode, in which their range of communication is significantly reduced compared to their normal operating range. Since, in whisper mode, only devices in close proximity to each other can communicate, they may exchange data without other similar wireless devices receiving the information. The data exchanged while in whisper mode may then be used to configure the devices, including providing them with unique identities, so that in their normal mode of operation, they can communicate uniquely and securely with each other. Activation of the whisper mode of operation may, for instance, be accomplished by pressing a button on one of the devices.

In a further embodiment of the invention, the whisper mode data exchange may be used to iteratively add additional wireless devices to an existing network of devices.

These and other features of the invention will be more fully understood by references to the following drawings.

DETAILED DESCRIPTION

The present invention relates to methods and apparatus for easily and securely creating and configuring wireless networks of consumer product devices.

An exemplary embodiment of the invention will now be described by reference to the accompanying drawings in which like numbered elements represent like elements.

Figure 1:
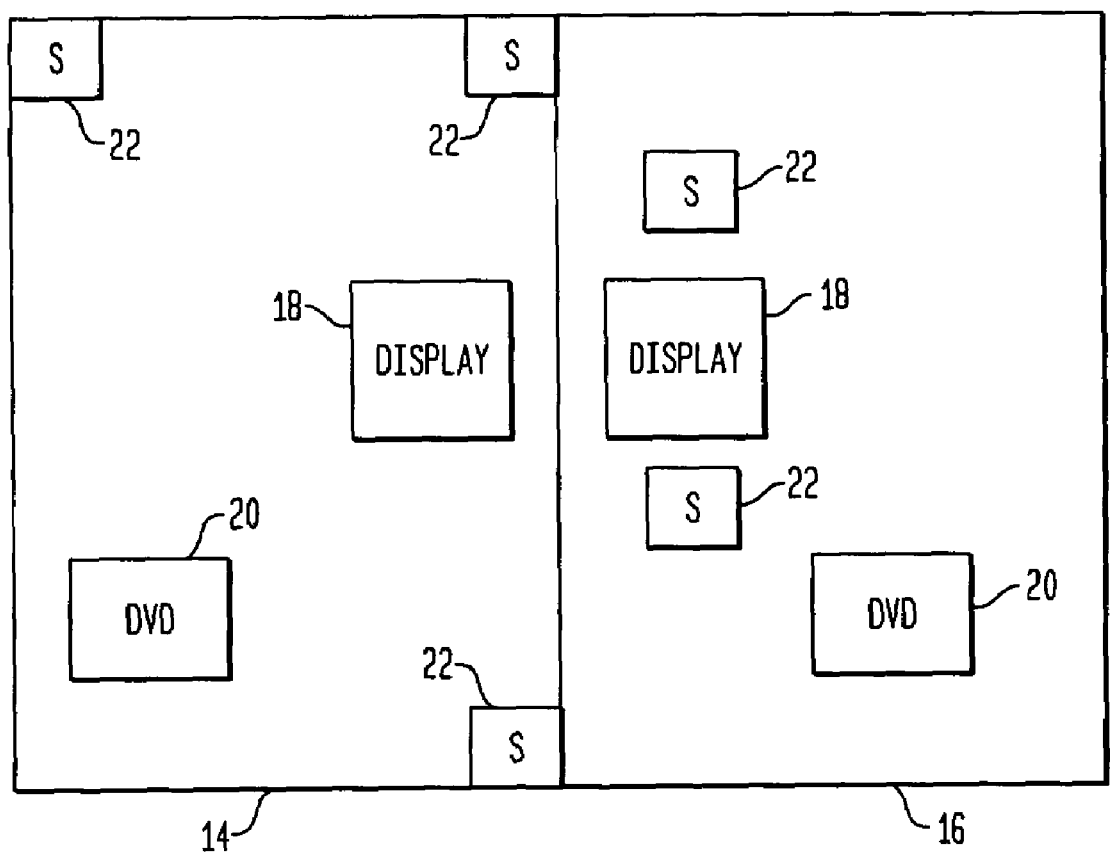
FIG. 1 represents a plan view of two adjacent apartments each having wireless consumer electronic products.

FIG. 1 represents a plan view of a first apartment 14 and a second, adjacent apartment 16, each having an exemplary plurality of wireless enabled consumer electronic products, including a wireless DVD player 20, a wireless video display unit 18 and wireless audio speakers 22.

Apartments 14 and 16 are intended to represent typical urban apartments having rooms in the region of 3 to 6 meters in depth and breadth and constructed of any well-known standard building materials including, but not limited to, wood, concrete, plaster and steel frame work. Wireless transmissions such as, but not limited to, the IEEE 802.11a, b and g protocol networks, commonly referred to as WiFi networks, operate in the 2.4 GHz and 5 GHz range and are designed to have a range of operation of 30-100 meters within typical structures constructed with typical designs using such materials. The result is that a WiFi enabled device in one room of such a dwelling is capable of communicating with a WiFi enabled device in at least the neighboring rooms. In urban environments, the neighboring rooms may be occupied by different users. Wireless DVD player 20 is an exemplary consumer electronic device having the well-known capabilities of a DVD player and enhanced to be able to communicate wirelessly by incorporation of a wireless transceiver such as that on a communication chip-set such as, but not limited to, the WaveLAN™ 802.11a/b/g chipset manufactured by Agere Systems Inc. of Allentown, Pa., USA. Similarly, video display unit 18 is another, exemplary consumer electronic device having the well-known capabilities of a video display unit such as, but not limited to, a television display or a video monitor display, which has been enhanced to include wireless communications capability by incorporation of a wireless transceiver such as that on a chip set such as, but not limited to, an Agere WaveLAN™ 802.11a/b/g chipset. Similarly, wireless audio speaker 22 is another exemplary, consumer electronic device having the well-known capabilities of a speaker unit. It is understood that the wireless DVD player, the wireless video display unit and the wireless speaker are meant as exemplary electronics devices and that the inventive concepts described herein can be applied to any suitable wirelessly enabled consumer electronics devices, including, but not limited to, handsets, cell phones, game consoles, toys, appliances, control devices and alarm or security system devices or components. Similarly, although the device has been described as been enhanced for WiFi communications, the inventive concepts described herein can be applied using most wireless communications protocols including, but not limited to, the well-known Bluetooth and General Packet Radio System (GPRS) protocols.

In FIG. 1, the wireless consumer electronics devices, namely wireless DVD 20, wireless video display 18 and wireless speaker 22, when operated using the default communications parameters associated with them during manufacture, are all capable of communicating with each other. That means the devices in room 14, operating on default communication parameters, can communicate with other devices in room 14 and also with all the devices in room 16 that are operating on default communications parameters. If a user wanted to create a network in room 14 that only included the devices in room 14, each device in room 14 would first have to be provided with a common network name (also known as "a Service Set Identification (SSID)") and a common secure key. Although such SSIDs, keys and wireless encryption systems are well known and include protocols such as, but not limited to, the well known Wire Equivalent Privacy (WEP) protocol, they are typically designed for linking computers wirelessly and generally require entering keys on each device. Computers, or computer devices, generally have keyboards, or keypads, directly attached them, making the entry of data relatively straightforward. Additionally, users of computers tend to be relatively technologically sophisticated. Consumer electronics devices typically do not have a keyboard. Some consumer electronics wireless devices such as, but not limited to, a wireless speaker 22, may only have a single on-off button or may be limited to a volume control. Users of wireless consumer electronic devices may be technologically unsophisticated.

Figure 2:
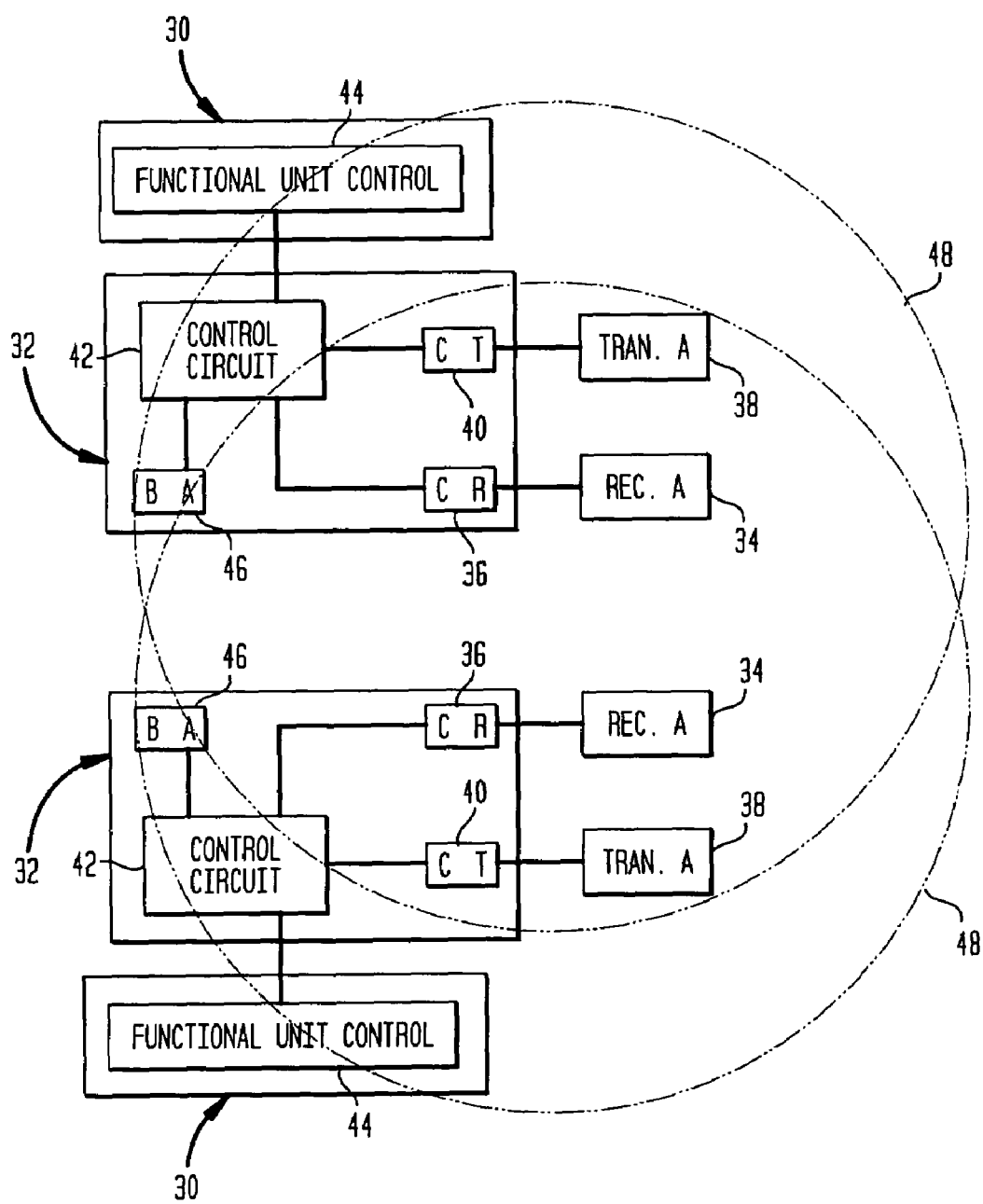
FIG. 2 represents two wireless consumer electronic products in whisper mode.

FIG. 2 shows a schematic representation of two wireless consumer electronics devices operating in a whisper communication mode in accordance with the inventive concepts of this invention. Each wireless device comprises a wireless transceiver 32 and a functional unit 30 having a functional control 44. Each wireless transceiver comprises a receiving antenna 34, a wireless receiving circuit 36, a wireless transmitting antenna 38, a wireless transmitting circuit 40, a control unit 42, and a whisper mode activation button or switch 46.

A wireless device may be any standard consumer product including, but not limited to, a DVD player, a video display unit, an audio speaker, a handset, a cell phone, a game console, a toy, an appliance, a control devices and an alarm or security system device or component, which have been enhanced to be capable of wireless communication by incorporation of some or all of the other elements represented within or attached to wireless transceiver 32 in FIG. 2. Functional unit 44 of device 30 is intended to represent the unique function capability of the particular consumer electronics device 30 such as, but not limited to, a DVD player or a video display screen and the associated electronic, mechanical and control elements required to produce that functionality. Within wireless transceiver 32, receiving antenna 34 and transmitting antenna 36 may be an antenna such as, but not limited to, the antenna incorporated in an Agere short antenna Type II extended PCMCIA 802.11b wireless LAN card. Wireless receiving circuit 36 and wire transmitting circuit 40 may be, but is not limited to, the receiving and transmitting circuits contained in the Agere WaveLAN™ 802.11a/b/g chipset. Control circuit 42 may be a control chip already incorporated in the consumer electronic device or may be a part of an wireless chip set such as, but not limited to, the Agere WaveLAN™ 802.11a/b/g chipset. Whisper mode activation button or switch 46 may be any suitable electronic switch such as, but not limited to, well-known pushbutton, rocker, toggle, pressure or proximity activated touch switch. Whisper mode activation switch 46 may also comprise an infrared or visible light switch used, for instance, so that pressing a switch 46 on a first device produces an infrared or visible light beam which then activate a corresponding infra red or visible light activated switch 46 on a second device. Whisper mode range of communication 48 represents a reduced range of communication which is the distance which the wireless consumer devices 30 can communicate when operating in whisper mode.

Two devices 30 may be configured to be a simple wireless network. More devices 30 may be added to form a more complex network.

Figure 3:
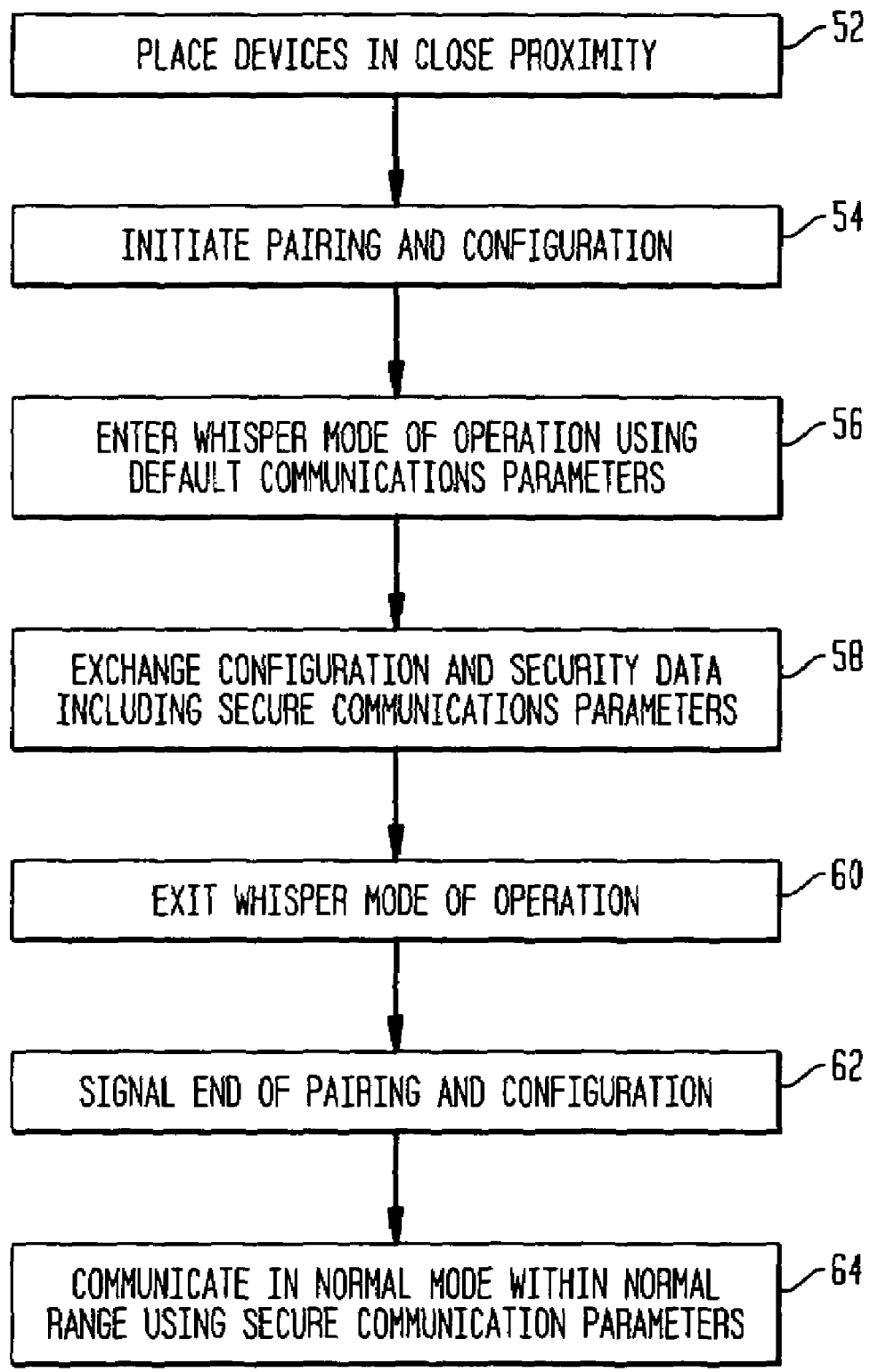
FIG. 3 is a flow diagram exemplifying an embodiment of the invention.

FIG. 3 is a flow diagram representing a method of implementing the inventive concepts of this specification. In step 52, the wireless devices to be connected together are placed in close proximity. That is, they are placed within the whisper mode range of communication 48, of each other, which may be a distance of as little as 1 meter. In step 54, the user initiates pairing and configuration. In a preferred embodiment, both the initiation of the whisper mode and the pairing and configuration are initiated by a single, simple user action such as, but not limited to, essentially simultaneously pressing a whisper mode activation button 46 on both wireless consumer electronics devices 30. Alternate embodiments of the invention include, but are not limited to, configurations in which whisper mode and subsequent pairing and configuration are each initiated by a separate action as for instance, a first pressing of buttons initiates whisper mode communication which, when successfully entered is indicated by, for instance, a light going on, after which a subsequent action such as a button press initiates the exchange of information.

In step 56, the wireless consumer electronic device enters a whisper mode in which its range of communication is considerably reduced. For instance, in the preferred embodiment, a WiFi enabled device normally able to communicate over a range of 30-100 meters is restricted to communicating only over a range of about 1 meter, thereby ensuring that it only communicates with the device to which it is being paired. This restricted range of communication may be achieved in a number of ways. In a preferred embodiment, the range restriction may be effected by a reduced reception sensitivity. This reduced reception sensitivity of the wireless transceiver 32 may be effected by a reduction in power to wireless reception circuit 36, by suitably programming amplifiers in the reception circuit for reduced amplification, by dispensing with or bypassing wireless reception antenna 34 or any combination thereof.

In a further embodiment of the invention, the whisper mode range restriction may be effected by a significantly reduced transmission capability of the wireless transceiver 32. This reduced transmission capability of the wireless transceiver 32 may be effected by an appropriate reduction in power to wireless transmitting circuit 40, by suitably programming amplifiers in the transmission circuit for reduced amplification, by dispensing with or bypassing wireless transmitting antenna 38, or any combination thereof. The whisper mode may also consist of reducing both reception sensitivity and transmission capability simultaneously by any suitable combination of the reception sensitivity reduction and transmission capability reduction methods described herein.

In a further embodiment, the whisper mode reduced range may achieved by taking advantage of the difference in transmission range with transmission speed. For instance the WiFi 802.11a/b/g protocols facilitate a transmission range of 30-100 meters when operating at an 11 Mbps data rate, but a transmission range of only 1-5 meters when operating at a 54 Mbps data rate. Whisper mode range reduction in a device wirelessly enabled by appropriate WiFi circuitry may therefore be achieved by switching to the higher transmission rate or by including such switching in addition to one or more of the other range reduction methods described herein.

In a further embodiment, the whisper mode reduced range of communication may be achieved by communicating between devices on neighboring communications channels that overlap, but do not provide full strength service. For instance, in normal wireless communication, each device is programmed to communicate on one of a number of channels, with both devices receiving and transmitting on the same communications channel. By, for instance, programming both devices to switch to a mode in which they are transmitting on one communications channel, but receiving on a neighboring, overlapping channel, the range of communications will be significantly reduced.

In one embodiment, factory default settings limit devices to transmitting on a first channel, but receiving on a second channel. As long as the channels have sufficient bandwidth overlap to allow usable "cross-talk" when the devices are in close proximity, they will automatically, initially operate in a whisper mode.

For instance, both transceivers may transmit on a channel "A", but receive on a channel "B", where channels "A" an "B" are frequency modulated channels, having different central frequencies $F_a$ and $F_b$, and each having a Gaussian shaped bandwidth. Frequencies $F_a$ and $F_b$, sufficiently close, i.e., there is sufficient overlap of bandwidth between them that, when the transceivers are in close proximity, usable "cross-talk" signal is detected by both transceivers. In this way a whisper mode may be established, having a reduced range of communication not accessible to a transceiver operating in a normal mode, at any of the transmission or reception frequencies being used.

This overlapping channel, reduced range of communication may be used in addition to one or more of the other range reduction methods described herein.

Once in whisper mode, the two wireless consumer electronics devices 30 proceed to setup a communications connection with each other. This may be done by, for instance using a set of default communication parameters, such as the factory default settings or default parameters set during manufacture or assembly of the transceivers and/or the device. The factory default settings or default communications parameters can be used and the data exchange will remain secure and confined to just the two devices that are in sufficiently close proximity to be within the restricted whisper mode range of communication.

In this whisper mode, a set of secure communications parameters may be confidentially exchanged. In an embodiment where such a confidential exchange of a set of secure communications parameters during whisper mode requires a user to maintain the whisper mode by simultaneously maintaining a state on both devices such as, but not limited to, simultaneously holding down a button on either device, the confidentiality of the exchange is further aided by its limited duration. These secure communications parameters will be used later, when the devices or their transceivers are using a normal mode of operation, to effect secure communications between the devices or any one device and another device on the network. The secure communications parameters include all necessary parameters such as, but not limited to, network and device configuration parameters, encryption and security parameters, keys, protocols and addresses can be exchanged that will allow a unique pairing of the two consumer electronic devices. The security information may include appropriate random numbers, or seeds for random numbers, to be exchanged to enable encrypted data exchange between the devices. The exchanged secure communications parameters may also allow the set up of unique pairings of the two consumer electronic devices and any other devices already in a wired or wireless network that includes either of the devices.

In a typical scenario, a user may already have a network of wireless consumer electronic devices to which he or she wishes to add one or more wireless devices. This new device may be added to the wired or wireless network by establishing a whisper mode of communication between the new device and any one of the existing network devices and exchanging appropriate data. This exchange of data may allow the new device to then establish a unique paired communication link with any of the other devices already incorporated into the wired or wireless network to which it is being added.

Whisper mode is exited in step 60. Exiting whisper mode may occur when the user ceases the action which initiated whisper mode, such as, but not limited to, releasing a whisper mode activation button 46. Exiting whisper mode may also occur at a predetermined time after the initiating action occurred, or it may last only until all necessary parameters to establish a unique paired communication have been exchanged. In other embodiments, exiting whisper mode may occur a predetermined time after a last user action.

In step 62, one or both of the wireless devices being paired signals that whisper mode communication has been exited and that pairing and configuration has ended. This may be signaled by, for instance, a light emitting diode (LED) that has been on during whisper mode, going off, or by an appropriate tone being emitted or ceasing to be emitted.

In step 64, the devices now communicate normally within their normal range of communication, but may do so securely using the parameters exchanged during pairing and configuration while in whisper mode, including, but not limited to, any necessary encryption keys. Once the devices are connected, normal communication is now performed in a single network. For instance, WiFi devices connected into a WiFi wireless network in this manner may now securely communicate with each other at 11 Mbps data rate within the normal 30-100 meter WiFi range, without interference to or from other WiFi devices not included in the network which may also be within that range.

Figure 4:
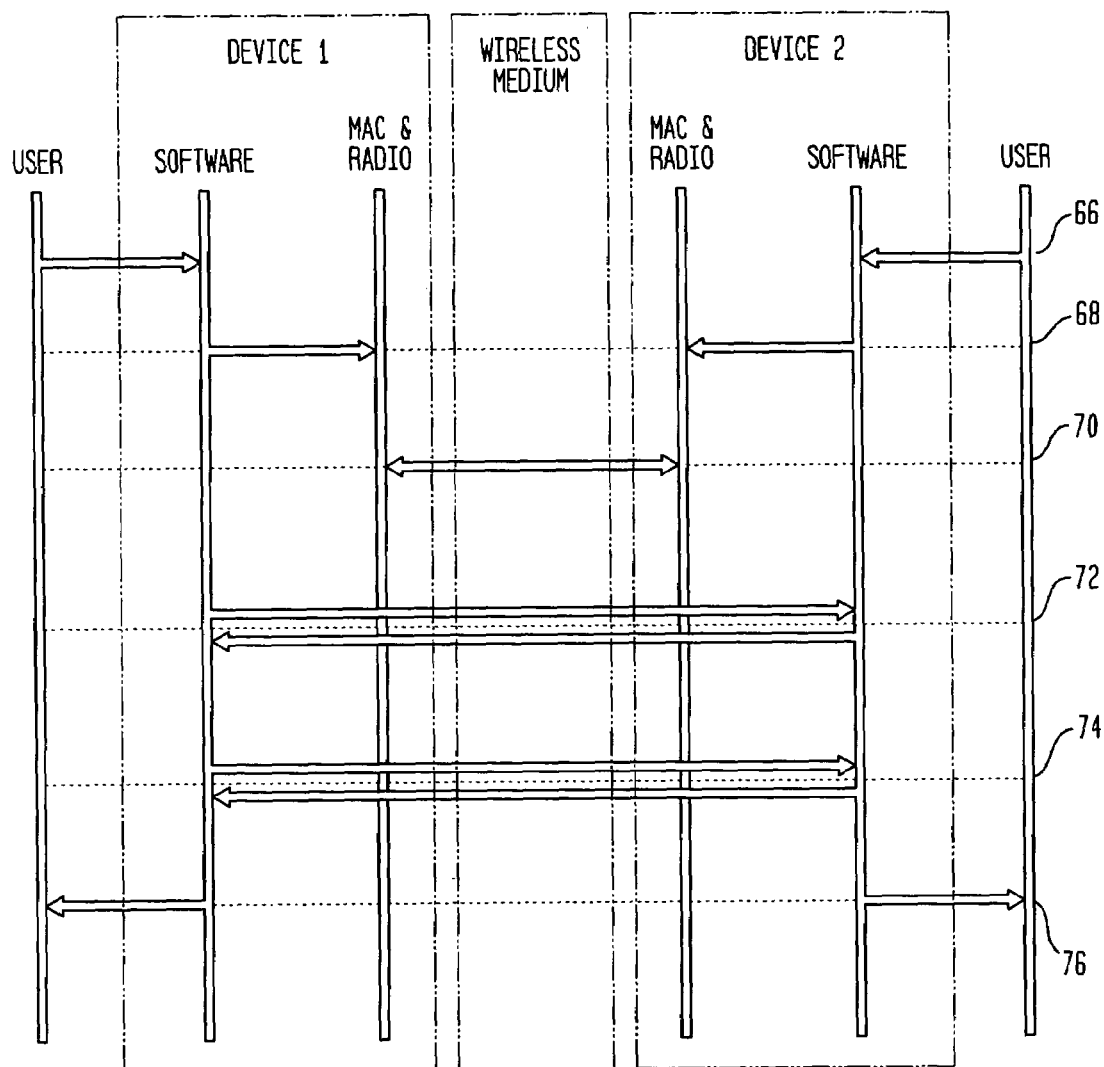
FIG. 4 is a message diagram exemplifying an embodiment of the invention.

FIG. 4 shows a message diagram for a preferred embodiment of the inventive concepts of this invention. At time 66, the user initiates the pairing and configuration mode by interacting with pairing and configuration software modules operating on each of the wireless devices being paired and configured to be part of the wireless network. At time 68, the pairing and configuration software module sends appropriate messages to the Medium Access Control (MAC) and Radio layers. These messages may include a setup request and parameters necessary to change the transmission power level and/or the receiver sensitivity. At time 70, the MAC and Radio layers of each device interact with each other to establish a network communications connection between each other. Such a setup is typically protocol dependent, but the interaction generally consists of each device scanning appropriate radio channels for the other device and transmitting broadcast signals to make itself known on the wireless medium, as is done, for instance, in setting up a Basic Service Set (BSS) network under the well-known IEEE 802.11 protocol. In other protocols, such as the well known Bluetooth or other well known IEEE 802 protocols, the interaction may be initiated on a predefined channel. Once the network communications connection between the two devices has been setup, the pairing and configuration software module is informed. Once the pairing and configuration software modules on each device know that a network communications connection has been established between the two devices, they exchange "configuration mode entered" messages at time 72. At time 74, the pairing and configuration software modules on each device exchange any necessary configuration information, which may be as little as, but is not limited to, a random number, while the transmission power and/or receiver sensitivity are low. Once the necessary information has been exchanged, the user is informed at time 76. The original transmission power and/or receiver sensitivity values may then be restored.

Further embodiments of the invention include, but are not limited to, have the whisper mode initiation of step 52, does not require simultaneous actions on both devices. One device may be place in whisper mode communication first, allowing a preset limited time for the other device to placed in whisper mode. During that period when one device is in whisper mode, there may be limited exchange of, for instance, handshake parameters in preparation for the second device being placed in whisper mode. In one embodiment, successful placement of the second device in whisper mode may initiate step 54 of exchange of a set of secure communications parameters.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for pairing and configuring two or more wireless devices, comprising the steps of:
   operating said first wireless device in a whisper mode, said whisper mode comprising a reduced range of communication compared to a normal mode of operation of said first wireless device,
   communicating between said first wireless device and a second wireless device located within said reduced range of said first wireless device wherein said communicating comprises exchanging configuration data;
   configuring said first wireless device and said second wireless device using said configuration data while said first wireless device is in said whisper mode; and
   once configured, communicating between said first wireless device and said second wireless device in said normal node.

2. A method as recited in claim 1, further comprising the step of securely communicating between said configured first and second wireless devices operating in said normal mode while separated by a distance within the normal range of said devices, said securely communicating comprising unique paired communication between said devices.

3. The method as recited in claim 1, wherein said communicating step further includes operating said second wireless device in said whisper mode.

4. The method as recited in claim 1, wherein said reduced range of communication comprises one of a reduced reception sensitivity of said first wireless device and a reduced transmission capability of said first wireless device, or a combination thereof.

5. The method as recited in claim 1, wherein said reduced range of communication comprises reducing a power level of a reception circuit in said first wireless device.

6. The method as recited in claim 1, wherein said reduced range of communication comprises reducing amplification of a reception circuit in said first wireless device.

7. The method as recited in claim 1, wherein said reduced range of communication comprises bypassing a reception antenna of said first wireless device.

8. The method as recited in claim 1 wherein said reduced range of communication comprises increasing a bit frequency rate of said first wireless device.

9. The method as recited in claim 1 wherein said reduced range of communication comprises said first wireless device receiving on a first communications channel a signal transmitted on a second, overlapping communications channel.

10. The method as recited in claim 1 wherein said step of operating in said whisper mode is activated by pressing a button.

11. A wireless network, comprising:
   a first wireless transceiver capable of operating in a whisper mode, said whisper mode comprising a reduced range of communication compared to a normal mode of operation of said first device;
   a switch capable of placing said first wireless transceiver in said whisper mode of operation; and
   a second wireless transceiver, capable of communicating with said first wireless transceiver operating in said whisper mode when in close proximity to said first wireless device;
   wherein said first wireless transceiver and said second wireless transceiver are capable of using said exchanged configuration data to securely communicate when operating in said normal mode and separated by a distance within the normal operational range of said wireless transceivers.

12. The network as recited in claim 11, wherein said communication occurs when said second wireless transceivers is operating in said whisper mode.

13. The network as recited in claim 11, wherein said a reduced range of communication comprises one of a reduced reception sensitivity of said first wireless transceiver and a reduced transmission capability of said first wireless transceiver; or a combination thereof.

14. The device as recited in claim 11, wherein said a reduced range of communication comprises reducing a power level of a reception circuit in said first wireless transceiver.

15. The device as recited in claim 11, wherein said a reduced range of communication comprises reducing amplification of a reception circuit in said first wireless transceiver.

16. The device as recited in claim 11, wherein a reduced range of communication comprises bypassing a reception antenna of said first wireless transceiver.

17. The device as recited in claim 11 in which a reduced range of communication comprises significantly increasing a bit frequency rate of said first wireless transceiver.

18. The device as recited in claim 11 in which said a reduced range of communication comprises said first wireless device receiving on a first communications channel, a signal transmitted on a second, neighboring communications channel.

* * * * *